United States Patent
Käufl et al.

(10) Patent No.: US 11,157,291 B2
(45) Date of Patent: Oct. 26, 2021

(54) METHOD FOR OPERATING A CONTROLLER AS A BUS PARTICIPANT IN A BUS NETWORK DURING A SUB-NETWORK OPERATION OF THE BUS NETWORK, CONTROLLER, AND MOTOR VEHICLE

(71) Applicant: Conti Temic microelectronic GmbH, Nuremberg (DE)

(72) Inventors: Georg Käufl, Painten (DE); Uwe Hennig, Ingolstadt (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 55 days.

(21) Appl. No.: 16/612,200

(22) PCT Filed: Apr. 27, 2018

(86) PCT No.: PCT/EP2018/060948
§ 371 (c)(1),
(2) Date: Nov. 8, 2019

(87) PCT Pub. No.: WO2018/206326
PCT Pub. Date: Nov. 15, 2018

(65) Prior Publication Data
US 2021/0141647 A1 May 13, 2021

(30) Foreign Application Priority Data
May 10, 2017 (DE) .................... 10 2017 207 858.8

(51) Int. Cl.
*G06F 9/4401* (2018.01)
*G06F 1/3287* (2019.01)
(Continued)

(52) U.S. Cl.
CPC .......... *G06F 9/4418* (2013.01); *G06F 1/3287* (2013.01); *G06F 13/4027* (2013.01);
(Continued)

(58) Field of Classification Search
CPC .. G06F 9/4418; G06F 1/3287; G06F 13/4027; H04L 12/40013; H04L 12/40039; H04L 2012/40215
See application file for complete search history.

(56) References Cited

U.S. PATENT DOCUMENTS

2005/0102430 A1 5/2005 Huber et al.
2007/0230484 A1* 10/2007 Hu .................... H04L 12/40039
370/401
(Continued)

FOREIGN PATENT DOCUMENTS

CN 105882439 A 8/2016
WO 2013/147900 A1 10/2013

OTHER PUBLICATIONS

Office Action dated Nov. 9, 2017 from corresponding German Patent Application No. DE 10 2017 207 858.8.
(Continued)

*Primary Examiner* — Nimesh G Patel

(57) ABSTRACT

Disclosed is a method for operating a controller as a bus participant in a bus network, wherein the controller comprises a microcontroller comprising a processor unit and a bus controller cell, and the processor unit is stopped for a sleep mode. If the processor unit is stopped, the bus controller cell receives bus messages from the bus network, the bus controller cell stores at least some of the received bus messages in a memory, the processor unit is activated at predetermined times and checks whether the memory contains a wake-up message for the controller, and, in this case,
(Continued)

the controller changes from the sleep mode to a wake mode, and otherwise the processor unit is stopped again.

10 Claims, 1 Drawing Sheet

(51) Int. Cl.
    *G06F 13/40*     (2006.01)
    *H04L 12/40*     (2006.01)

(52) U.S. Cl.
    CPC .. *H04L 12/40013* (2013.01); *H04L 12/40039* (2013.01); *H04L 2012/40215* (2013.01)

(56) References Cited

U.S. PATENT DOCUMENTS

| | | | | |
|---|---|---|---|---|
| 2009/0073481 | A1* | 3/2009 | Ferlitsch | G06F 1/3203 358/1.14 |
| 2010/0299466 | A1 | 11/2010 | Asano et al. | |
| 2011/0213992 | A1* | 9/2011 | Satsangi | G06F 1/3209 713/300 |
| 2013/0067129 | A1 | 3/2013 | Kashima et al. | |
| 2013/0250338 | A1* | 9/2013 | Park | G06F 3/1221 358/1.13 |
| 2014/0186035 | A1* | 7/2014 | Lee | H04J 14/0221 398/45 |
| 2016/0202673 | A1* | 7/2016 | Ehtemam-Haghighi | G05B 15/02 700/275 |
| 2017/0120768 | A1 | 5/2017 | Zhang | |
| 2020/0393891 | A1* | 12/2020 | Baggett | H04L 12/12 |

OTHER PUBLICATIONS

International Search Report and Written Opinion dated Jun. 25, 2018 from corresponding International Patent Application No. PCT/EP2018/060948.

* cited by examiner

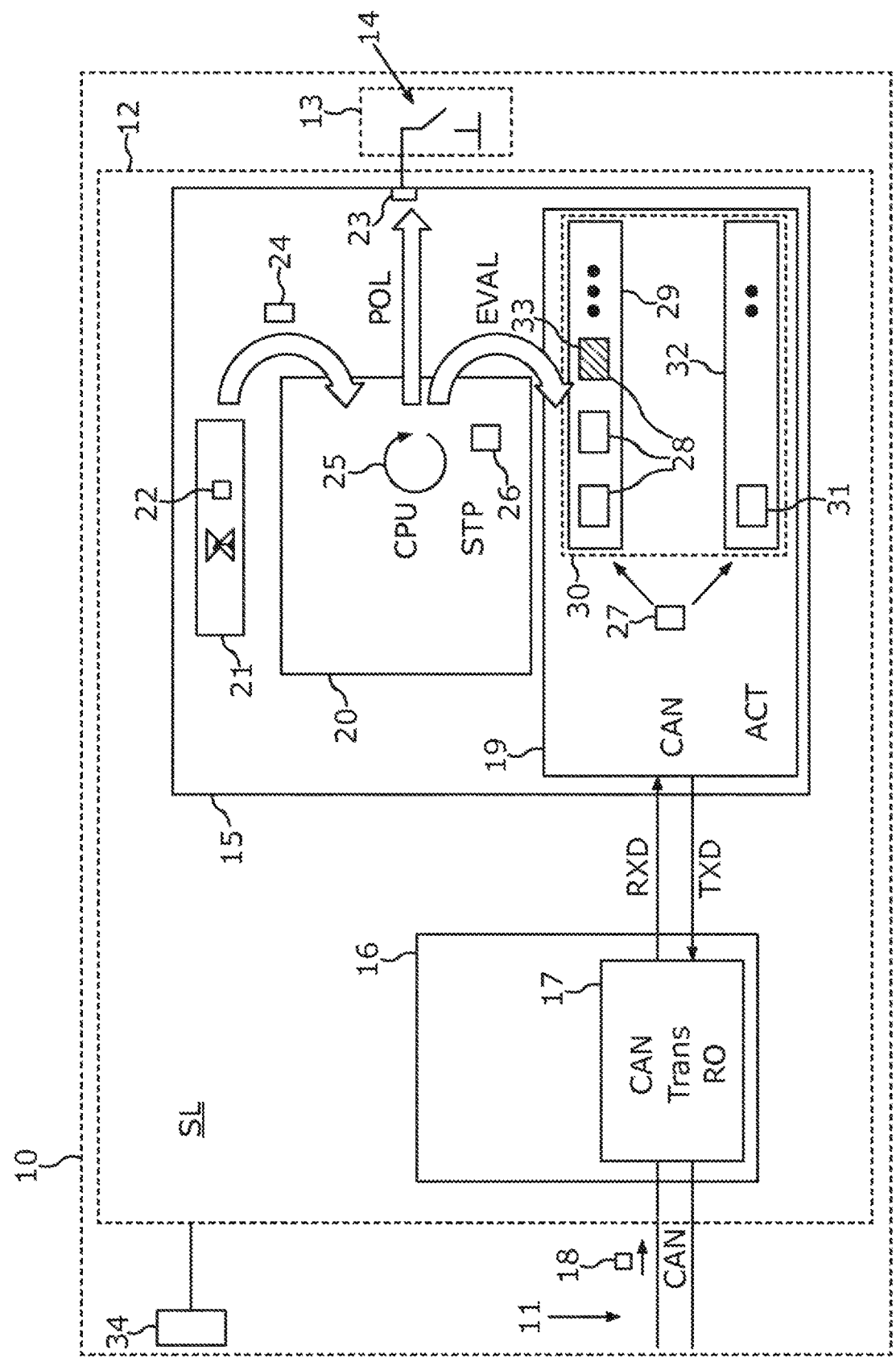

METHOD FOR OPERATING A CONTROLLER AS A BUS PARTICIPANT IN A BUS NETWORK DURING A SUB-NETWORK OPERATION OF THE BUS NETWORK, CONTROLLER, AND MOTOR VEHICLE

The invention relates to a method for operating a controller as a bus participant in a bus network. Operation is carried out during partial network operation of the bus network, during which the controller is not required, that is to say is intended to be operated in a standby mode or sleep mode and/or must not transmit any bus messages. The invention also includes the controller and a motor vehicle having the controller according to the invention.

Said bus network may be, in particular, a Controller Area Network (CAN), as can be provided in a motor vehicle for the purpose of transmitting bus messages between controllers. Such a bus message is a data packet containing communication data. Partial network operation according to ISO 11898-2 is defined for such a CAN. In order to be able to switch off a microcontroller for the sleep mode and to nevertheless be able to react to a wake-up message for reactivating the microcontroller, wake-up logic is usually implemented by means of hardware in the CAN transceiver or the system basic chip (SBC). This hardware solution comprises the reception of CAN messages, including the subsequent interpretation or evaluation, in order to be able to detect a wake-up message and to then start the microcontroller. This processing can comprise, for example, so-called destuffing, a consistency check, filtering for a network management message (NM message) and the evaluation of the message content of the NM messages found for a wake-up message.

The disadvantage of this known hardware solution for detecting a wake-up message (wake-up frame) for a specific controller is that the CAN transceiver or the system basic chip must be able to process the bus messages in order to detect a wake-up message for the controller. This makes the hardware solution technically complicated. In order to resolve individual bits for example, an accordingly more accurate oscillator must be held or operated in the transceiver.

The invention is based on the object of providing a sleep mode for a controller with little technical effort, from which mode the controller can be woken up by means of a wake-up message via a bus network.

The object is achieved by the subjects of the independent patent claims. Advantageous developments of the invention are described by the dependent patent claims, the following description and the FIGURE.

The invention provides a method for operating a controller as a bus participant in a bus network. The method can be carried out during partial network operation of the bus network. In this case, the controller is a bus participant which is intended to be in a sleep mode, that is to say is intended to have deactivated part of its hardware or is intended to reduce at least a power consumption with respect to normal operation, for example. In the sleep mode, the controller must not send any bus messages. The invention is based on the fact that the controller has a microcontroller having a processor unit (CPU—Central Processing Unit) and a bus controller cell. The processor unit and the bus controller cell may be implemented on a common substrate or IC (Integrated Circuit). The bus controller cell in this case provides an electronic circuit of a bus controller, as is defined, for example, in connection with the CAN in the standard ISO 11898-1. The term "cell" here means that the electronic circuit of the bus controller cell can be operated independently of an activity of the processor unit. For this purpose, a separate voltage supply and/or a separate clock signal can be provided for the bus controller cell independently of the processor unit.

The microcontroller is connected to the bus network via a transceiver. Overall, the processor unit (CPU) is coupled in this case to the transceiver via the bus controller cell and the transceiver is connected to the bus network. The processor unit is stopped in said sleep mode. In other words, a processor clock pulse or a clock signal (clock) is not provided in the processor unit, with the result that its program counter is stopped, for example. The processor unit is therefore in a stop mode. As a result, no power is consumed by the processor unit.

The following steps are carried out in the sleep mode of the controller. If the processor unit is stopped, the bus controller cell is operated further independently of the processor unit, that is to say it is in an active mode. In other words, a processor clock pulse or a clock signal is provided for the bus controller cell. The bus controller cell can therefore receive bus messages from the bus network via the transceiver. If bus messages are received, the bus controller cell stores at least some of the received bus messages in a memory. Such a memory may be, for example, a RAM (Random Access Memory). The processor unit is activated at predetermined times. This means that it is operated with a processor clock pulse or a clock signal. It is therefore switched to an active mode. The activation can be repeated cyclically, for example, that is to say the active mode can be switched on once, for example, in a time range of 10 ms to 200 ms. The processor unit then respectively uses an evaluation program to check whether the memory contains or stores a wake-up message for the controller as a bus message. In this case, that is to say if the memory contains a wake-up message, the controller is changed over from the sleep mode to a wake mode in which the processor unit remains activated and transmits bus messages to the bus network. Otherwise, that is to say if the memory does not contain a wake-up message for the controller, the processor unit is stopped again. The bus controller cell can then continue to receive new bus messages in the described manner and can store them in the memory.

The invention results in the advantage that the transceiver must only receive bus messages and pass them to the bus controller cell. It must therefore not be designed to itself process a bus message to the effect that a wake-up message is detected and the microcontroller is then started. Instead, all possible bus messages can first of all be stored in a memory by the bus controller cell with little processing effort. The processor unit itself is then used to execute an evaluation program using its hardware which is present anyway in order to check for the presence of a wake-up message.

The invention also includes developments that provide further advantages.

One development relates to the question of which bus messages are intended to be stored in the memory. For this purpose, the bus controller cell preferably operates a filter unit which filters network management messages (NM messages) from the received bus messages. A network management message controls the behavior of a bus participant with respect to the bus network. Each network management message which has been filtered out is stored in a queue of the memory for the evaluation program. The evaluation program therefore receives only those bus messages for the check or evaluation which could potentially be a wake-up message. In this case, a filter unit can be provided with little effort since a network management message can be detected from the message type. The message type can be indicated by a message ID. Each bus message therefore contains a message ID, that is to say a bit string, which can state, for example: "NM" if it is a network management message. The filter unit may be in the form of circuit logic having a register for configuring a filter pattern or in the form of a program module. Filtering can be carried out by means of a bit comparison.

The bus controller cell then preferably stores the network management message in the memory irrespective of its content. The bus controller cell itself therefore need not be set up to detect whether a bus message is also actually a wake-up message for the controller. The bus controller cell therefore generally stores each bus message to be stored in the memory irrespective of its content or the specific instruction contained therein.

However, not only one network management message is preferably stored. A further advantage arises if the bus controller cell stores at least the last received bus message in a buffer memory. If the buffer memory therefore contains a bus message, this means that data traffic or bus messages has/have actually been transmitted via the network bus. If this is not the case, there is clearly no controller at all which is active on the network bus. This is an indication of the fact that the entire bus network has been switched off or interrupted. The controller itself must then also be accordingly switched off or an emergency mode must be activated. This can therefore be indirectly controlled by evaluating the buffer memory. Specifically, if the queue does not contain a wake-up message for the controller and the buffer memory has remained empty, the microcontroller, in particular the entire controller, is completely switched off or is switched from the sleep mode to an emergency mode. Naturally, provision may be made for the memory to be emptied or erased after each run of the evaluation program, with the result that, each time the processor unit is activated again, the memory stores only those bus messages which have newly arisen or have been newly received since the last run of the evaluation program. The "complete switching-off" naturally also comprises the possibility of waking up or activating the controller again via an electrical signal. The switching-off comprises, in particular, the fact that the bus controller cell is switched off. The emergency mode can be activated if it is detected, on the basis of an ignition-on signal from the motor vehicle, that the bus network should actually be active as intended.

In order to further reduce an energy consumption, the transceiver is preferably operated in a receive-only mode. Such a "receive-only mode" prevents a power consumption for the transmitting unit of the transceiver. The result is pure listening operation. In contrast, in a normal mode after a bus message has been received, it would be necessary to send an acknowledge message (ACK) or a confirmation message, which in turn would consume energy.

If the processor unit is activated in the sleep mode in order to perform the evaluation program, provision is made in this respect, in particular, in order to activate the processor unit, for the latter to be operated directly with a crystal clock pulse while bypassing a PLL unit of a clock multiplier (PLL—Phase Locked Loop). As a result, although the processor unit is operated with a lower clock rate, the transient recovery time of the PLL unit is advantageously avoided or omitted. On the basis of the crystal clock pulse, the processor unit can directly start the execution of the evaluation program. In contrast, in the wake mode, the processor unit can be operated by means of the clock multiplier.

The processor unit is preferably not exclusively activated in order to perform the evaluation program. Rather, the evaluation program is preferably performed by the processor unit together with the performance of a polling loop for polling (polling—active or cyclical querying or checking) at least one connection of the microcontroller. A change in an electrical signal at the connection of the microcontroller can then be detected by the polling and the processor unit can accordingly react to this. A polling loop is a program routine which is run through cyclically. The evaluation program can be carried out before or after performing the polling loop or can be integrated in the polling loop.

In order to minimize the effort needed to monitor and activate the processor unit, provision is made, in particular, for the processor unit to be started by means of a hardware timer (HW timer). As a result, it is necessary only to operate such an integrated circuit specialized for time recording, thus advantageously making it possible to reduce the power consumption in comparison with, for example, an interrupt-controlled queue in the processor unit itself.

The described method can be used beneficially in a CAN, in particular. In other words, the bus network is preferably a CAN bus network and the bus controller cell is a CAN controller cell. The bus transceiver is provided by a small transceiver or by a system basic chip. As a result, it is possible to implement the partial network operation according to ISO 11898-2.

The invention also includes said controller for a motor vehicle. The controller can be operated in accordance with the method according to the invention. For this purpose, the controller has a microcontroller and a bus transceiver or transceiver for short. The microcontroller has the processor unit and the bus controller cell. The microcontroller is designed such that the processor unit can be stopped and the bus controller cell can be operated further in the meantime. The controller overall is set up to operate the microcontroller and the transceiver according to one embodiment of the method according to the invention.

Finally, the invention also comprises a motor vehicle having a bus network, in particular a CAN, and having at least one controller which is connected to the bus network and constitutes an embodiment of the controller according to the invention. The bus network can be operated in partial network operation, in which case any controller operated in the sleep mode in this case can be operated further in the described manner with little energy expenditure and circuit complexity in order to react to a wake-up message.

The motor vehicle according to the invention is preferably in the form of an automobile, in particular in the form of a passenger vehicle or a truck.

An exemplary embodiment of the invention is described below. In this respect, the single FIGURE (FIG.) shows a schematic illustration of one embodiment of the motor vehicle according to the invention.

The exemplary embodiment explained below is a preferred embodiment of the invention. In the exemplary embodiment, the described components of the embodiment each constitute individual features of the invention that should be considered independently of one another and that in each case also develop the invention independently of one another and should therefore also be regarded as a constituent part of the invention individually or in a combination other than that shown. Furthermore, the embodiment described may also be supplemented by further features of the invention from among those that have already been described.

The FIGURE shows a motor vehicle 10 which may be an automobile, in particular a passenger vehicle or a truck. A bus network 11, which may be, in particular, a CAN bus or a CAN, can be provided in the motor vehicle 10. A controller 12, which may be, for example, a controller for controlling at least one function of a vehicle door of the motor vehicle 10, can be connected to the bus network 11. For example, the controller 12 can be used to control a window lifter and/or an electrical exterior mirror. In order to capture an operating action of a user, at least one operating element 13, which may be in each case a pushbutton 14 or a rocker switch, can be connected to the controller 12. The controller 12 may have a microcontroller 15 and a system basic chip 16 having a transceiver 17 (CAN Trans). The microcontroller 15 can be connected or coupled to the bus network 11 via the transceiver 17. The transceiver 17 can receive bus messages 18 from the bus network 11 and can make them available to the microcontroller 15, for example via a receiving line RXD. A bus message to be sent by the microcontroller 15 can be transmitted, for example via a transmitting line TXD, to the transceiver 17 which can then send the bus message to be sent in the bus network 11.

Inside the microcontroller 15, a received bus message 18 can be received by a bus controller cell 19. A bus message to be sent can likewise be generated by the bus controller cell 19. In order to perform an operating program, the microcontroller 15 may have a processor unit 20 (CPU). A hardware timer 21 may also be provided.

For partial network operation of the bus network 11, a sleep mode SL may be provided for the controller 12. Provision may be made for the processor unit 20 to be stopped (stop mode STP) in the sleep mode, for the bus controller cell 19 to be active (active mode ACT) and for the transceiver 17 of the system basic chip 16 to be operated in a receive-only mode RO. The hardware timer 21 can be set to a timer value 22, after the expiry of which the hardware timer 21 activates the processor unit 20, that is to say changes it from the stop state to an active state. The timer value 22 may be in a range from 10 ms to 200 ms, for example may be 50 ms.

The switch 14 of the operating element 13 can be connected to a connection 23 of the microcontroller 15. After expiry of the timer value 22, the hardware timer 21 generates a switching signal 24 for activating the processor unit 20. The latter can then perform a run of a polling loop 25, that is to say can execute a program code in which the connection 23 is queried and the switching state of the switch 14 is determined thereby.

The activated processor unit 20 may also execute an evaluation program 26 which is used to check, in a software-based manner, whether an instruction indicating that the controller 12 is intended to terminate the sleep mode SL has been sent to the controller 12 via the bus network 11.

Since the bus controller cell 19 remains active in the sleep mode SL even though the processor unit 20 is in the stop mode STP, it is possible for this pure software solution to be implemented in the microcontroller 15 itself. In order to enter partial network operation, the bus controller cell 19 of the microcontroller 15 is programmed, in order to activate the sleep mode SL, in such a manner that network management messages 28 are filtered out or detected from the received bus messages 18 by means of a filter unit 27 and are then stored in a queue 29 in a memory 30. The queue 29 may be a FIFO queue (FIFO—first in first out). Provision may optionally be made for at least the last received bus message 18 to always be stored in a buffer 32 of the memory 30 independently of the filter unit 27. This may therefore also be, for example, a useful message or a communication message.

In the meantime, the processor unit 20 is in the stop mode STP. The processor unit 20 is cyclically woken up by the hardware timer 21 in the described manner and evaluates the content of network management messages 28 in the queue 29 by executing the evaluation program 26. The transceiver 17 and the SBC 16 generally need not be able to themselves filter bus messages 18 and/or identify their content in the sleep mode SL. Accordingly, a clock generator is also not required for the SBC 16. Rather, the evaluation of the message contents of the network management messages 28 can be made more flexible by using the microcontroller 15 and, in particular, its processor unit 20. The reason for this is that an evaluation program 26 which can be adapted is used.

In this case, the transceiver 17 can be continuously operated in the receive-only mode RO. If a wake-up instruction 33 for the controller 12 is detected in one of the network management messages 28, the microcontroller 15 switches to an active mode, that is to say the sleep mode SL is terminated and the processor unit 20 is switched from the stop mode STP to its active mode and can then send bus messages via the bus network 11, for example.

By evaluating the buffer 32, the processor unit 20 can also detect whether data traffic, that is to say bus messages, has actually been transmitted via the bus network 11 since the last performance of the evaluation program 26. If this is not the case, the remaining bus network 11 has clearly been switched off. The microcontroller 15 can then also be switched off, that is to say can be changed from the sleep mode SL to a so-called deep sleep or, if it is detected that an ignition 34 is still switched on in the motor vehicle 10, an emergency mode is activated since it can be assumed, if the ignition 34 is switched on and there are no bus messages 18 in the bus network 11, that there is a defect or an interruption in the bus network 11.

Important aspects of the configuration of the controller 12 are therefore the following, in particular:

A CAN controller cell is in the active mode the entire time and filters the bus messages, some of which may be network management messages. It stores network management messages in the queue. The depth or the storage capacity of the queue is sufficient to receive or store all of the network management messages arising during the timer value 22. This can be determined in advance on the basis of the specification of the bus network 11.

Furthermore, the last received bus message 18 can be stored in the buffer 32 irrespective of its message ID and data content.

The processor unit 20 is cyclically woken up by the hardware timer 21 and then preferably runs directly with the crystal clock pulse in order to avoid the PLL transient recovery time. The processor unit 20 can then check at least one connection 23 by means of polling POL. Furthermore, the processor unit 20 can assess or evaluate the stored bus messages. In the queue 29, a check is carried out in order to determine whether a message content provides the request for waking up or terminating the sleep mode SL for the controller 12 (wake-up message). In this case, the waking-up from the sleep mode SL or the termination of the sleep mode SL is carried out. In the buffer 32, a check is carried out in order to determine whether a message 31 is included. If this is not the case, any message is therefore missing and either the transition to the deep-sleep mode (switching-off of the microcontroller 15) is carried out, if the ignition 34 is also switched off, or an emergency mode is activated if the ignition 34 is still switched on.

The transceiver 17 can be optionally operated in the receive-only mode RO in the sleep mode SL of the controller 12. However, the method is also suitable for a normal mode of the transceiver 17 (that is to say reception and transmission).

Overall, the example shows how CAN partial network operation can be implemented using software by means of the invention.

The invention claimed is:

1. A method for operating a controller as a bus participant in a bus network during partial network operation of the bus network, wherein the controller comprises a microcontroller comprising a processor unit and a bus controller cell, and the microcontroller is connected to the bus network via a transceiver of the controller, and the processor unit is stopped for a sleep mode, wherein:
   if the processor unit is stopped, the bus controller cell is operated further in order to receive bus messages from the bus network via the transceiver,
the bus controller cell stores at least some of the received bus messages in a memory,
   the processor unit is activated at predetermined times and uses an evaluation program to check whether the memory contains a wake-up message for the controller as a bus message, and
   in this case, the controller changes from the sleep mode to a wake mode in which the processor unit remains activated and transmits bus messages into the bus network, and the processor unit is otherwise stopped again,
   wherein, activating the processor unit in the sleep mode comprises said processor unit being operated directly with a crystal clock pulse whilst bypassing a PLL unit of a clock multiplier.

2. The method as claimed in claim 1, wherein the bus controller cell operates a filter unit which filters predetermined network management messages from the received bus messages and stores each network management message which has been filtered out in a queue of the memory for the evaluation program.

3. The method as claimed in claim 2, wherein the bus controller cell stores at least a last received bus message in a buffer memory and, if the queue does not contain a wake-up message for the controller and the buffer memory has remained empty, the microcontroller is completely switched off or is switched from the sleep mode to an emergency mode.

4. The method as claimed in claim 1, wherein the bus controller cell stores each bus message to be stored in the memory irrespective of its content.

5. The method as claimed in claim 1, wherein the transceiver is operated in a receive-only mode in the sleep mode.

6. The method as claimed in claim 1, wherein the evaluation program is performed by the processor unit together with a polling loop configured to poll at least one connection of the microcontroller.

7. The method as claimed in claim 1, wherein the processor unit is started using a hardware timer.

8. The method as claimed in claim 1, wherein the bus network is a CAN bus network and the bus controller cell is a CAN controller cell and the transceiver is provided by at least one of a CAN transceiver and a system basic chip.

9. A controller for a motor vehicle, wherein the controller comprises a microcontroller comprising a processor unit and a bus controller cell and a transceiver, wherein the controller is configured to operate the microcontroller and the transceiver according to the method as claimed in claim 1.

10. A motor vehicle comprising a bus network and at least one controller as claimed in claim 9, the at least one controller connected to the bus network.

* * * * *